(12) United States Patent
Jhoney et al.

(10) Patent No.: US 8,352,908 B2
(45) Date of Patent: Jan. 8, 2013

(54) MULTI-MODAL CONVERSION TOOL FOR FORM-TYPE APPLICATIONS

(75) Inventors: Albee Jhoney, Bangalore (IN); Praveen Kumar Vaidyanathan, Porur (IN)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 12/824,408

(22) Filed: Jun. 28, 2010

(65) Prior Publication Data

US 2011/0321008 A1 Dec. 29, 2011

(51) Int. Cl.
*G06F 9/44* (2006.01)
(52) U.S. Cl. ......................... 717/106; 717/109
(58) Field of Classification Search ........... 717/106–109
See application file for complete search history.

(56) References Cited

U.S. PATENT DOCUMENTS

| | | | |
|---|---|---|---|
| 5,265,014 A | 11/1993 | Haddock et al. | |
| 5,577,165 A | 11/1996 | Takebayashi et al. | |
| 5,878,274 A | 3/1999 | Kono et al. | |
| 6,779,060 B1 | 8/2004 | Azvine et al. | |
| 6,839,896 B2 | 1/2005 | Coffman et al. | |
| 7,020,841 B2 | 3/2006 | Dantzig et al. | |
| 7,137,126 B1 | 11/2006 | Coffman et al. | |
| 7,284,207 B2* | 10/2007 | Canfield et al. | 715/842 |
| 7,685,252 B1 | 3/2010 | Maes et al. | |
| 2004/0121814 A1 | 6/2004 | Creamer et al. | |
| 2006/0195320 A1 | 8/2006 | Carpenter | |
| 2008/0065390 A1 | 3/2008 | Ativanichayaphong et al. | |
| 2009/0006099 A1 | 1/2009 | Sharpe et al. | |
| 2009/0119586 A1 | 5/2009 | Weng et al. | |
| 2009/0119587 A1 | 5/2009 | Allen et al. | |
| 2011/0004841 A1* | 1/2011 | Gildred et al. | 715/780 |

(Continued)

FOREIGN PATENT DOCUMENTS

JP 2007033478 A 2/2008

OTHER PUBLICATIONS

Huang. X; et al., "MiPad: a multimodal interaction prototype", Acoustics, Speech, and Signal Processing, 2001. Proceedings. (ICASSP '01). 2001 IEEE International Conference on vol. 1, May 7-11, 2001 pp. 9-12 vol. 1.

(Continued)

*Primary Examiner* — Anna Deng
(74) *Attorney, Agent, or Firm* — Patents on Demand P.A.; Brian K. Buchheit; Scott M. Garrett

(57) ABSTRACT

GUI form code comprising a set of GUI elements can be imported. A user interface description can be generated from the GUI form code that has an element corresponding to each GUI element. For each user interface element converted from a corresponding to one of the GUI elements, a user interface element type can be determined as can temporal associations between the user interface elements. A Conversation User Interface (CUI) code corresponding to the GUI form code can be created from the user interface description. When creating the CUI code for each of the user interface elements, different and rules to convert the user interface element into CUI code can be used depending on a user interface element type of the user interface element being converted. When creating the CUI code, the user interface elements can be temporally ordered based on the pre-determined spatio-temporal associations between the graphical user interface (GUI) elements.

18 Claims, 9 Drawing Sheets

U.S. PATENT DOCUMENTS

2011/0276895 A1* 11/2011 van Der Fiier et al. ....... 715/751

OTHER PUBLICATIONS

Ramaswamy, G., et al., "A pervasive conversational interface for information interaction," Eurospeech99, Budapest, Hungary, 1999—research.ibm.com.

Hickey, M., et al., "Lessons from the Development of a Conversational Interface", [online] Proc. Eurospeech, Sep. 3-7, 2001 [retrieved Jun. 14, 2010] retrieved from the Internet: <http://www.hpl.hp.com/techreports/2001/HPL-2001-77.pdf>.

"WC3 Ubiquitous Web Domain—Multimodal Interaction Activity," [online] WC3 [retrieved Jun. 14, 2010] retrieved from the Internet<http://www.w3.org/2002/mmi/>.

"W3C Multimodal Interaction Framework," [online] WC3 [retrieved Jun. 14, 2010] retrieved from the Internet: <http://www.w3.org/TR/mmi-framework/>.

McCobb, G., "The W3C Multimodal Architecture, Part 1: Overview and challenges—What you should know about the emerging architecture for distributed multimodal applications," [online] IBM DeveloperWorks, May 8, 2007, [retrieved Jun. 14, 2010] retrieved from the Internet: <http://www.ibm.com/developerworks/web/library/wa-multimodarch1/>.

Plomp, C.J., "A Generic Widget Vocabulary for the Generation of Graphical and Speech-Driven User Interfaces," [online] International Journal of Speech Technology 5, 39-47, 2002, [retrieved Jun. 14, 2010] retrieved from the Internet: <http://www.springerlink.com/content/x637587353t417n2/fulltext.pdf>.

Ertl, D., "Semi-Automatic Multimodal User Interface Generation," [online] Proc. 1st ACM SIGCHI Symposium on Engineering Interactive Computing Systems, pp. 321-324, 2009 [retrieved Mar. 24, 2010] retrieved from the Internet: <http://portal.acm.org/citation.cfm?id=1570494&dl=GUIDE&coll=GUIDE&CFID=80644008&Cftoken=41226409>.

Tiwari, A., et al., "Conversational Multi-Modal Browser: An Integrated Mutli-Modal Browser and Dialog Manager," IEEE Proc. of 2003 Symposium on Applications and the Internet (Saint '03), 2003.

"AP2620IVR, IVR VoIP Gateway High Performance IVR VoIP Gateway Solution," AddPac Technology Company, Ltd., 2006 Sales and Marketing Brochure.

Raisamo, R., "User Interface Agents," Dept. of Computer and Information Sciences, University of Tampere, 1999.

\* cited by examiner

GUI Description 530

```
<GUI>
532 <Group name="Login Form" type="container" layout="table" Hsize=3 Vsize=2>
534 {<Element name="User Name" type="display" properties=* HPos=1 VPos=1/>
    {<Element name="Uname" type="input" properties=* HPos=1 VPos=2/>
536 {<Element name="Email" type="display" properties=* HPos=2 VPos=1/>
    {<Element name="Email" type="input" properties=* HPos=2 VPos=2/>
538 <Element name="submit" type="action" properties=* HPos=3 VPos=2/>
    </Group>
    </GUI>
```

FIG. 5A

UI Description 540

```
<UI>
    <CG name="Login Form" orderNumber="1"> 542
544 <CSG name="UserName" type="assertion" properties=* orderNumber="1"/>
546 <CSG name="Email" type="assertion" properties=* orderNumber="2"/>
548 <CSG name="Submit" type="action" properties=* orderNumber="3"/>
    <CG>
    </UI>
```

FIG. 5B

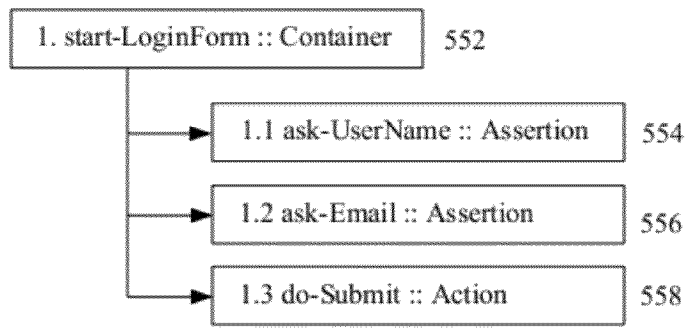

FIG. 5C

User: Hello, I would like to login. Start the login process.    800

System: Hello User. You need to have a user name and Email ID Credentials for logging in. If you have the login credentials, tell me your UserName. Else contact Administrator.

User: Yes, I have my credentials. My User Name is GuestUser

System: Please provide your EmailID

User: GuetsUser@ABCSystem.com

System: Here are the summary of your credentials.
  UserName: GuestUser
  EmailID: GuetsUser@ABCSystem.com
  Do you wish to login with these credentials?

User: No, I want to change my EmailID.

System: Please re-enter your EmailID

User: My email-id is GuestUser@ABCSystem.com

System: Here are the summary of your credentials.
  UserName: GuestUser
  EmailID: GuestUser@ABCSystem.com
  Do you wish to login with these credentials?

User: Yes

System: Login Success.

FIG. 8

MULTI-MODAL CONVERSION TOOL FOR FORM-TYPE APPLICATIONS

BACKGROUND

The present invention relates to the field of user interface design and, more particularly, to a multi-modal conversion tool for form-type applications.

User interfaces have been an ever-evolving aspect of software development. From punch cards to command prompts to graphical user interfaces (GUIs), user interfaces have always strived to provide users with an easy-to-use means of interaction. While the easiest means of communication is speech, a multitude of problems have kept conversation user interfaces (CUIs) from frequent use.

However, advancements in the field of speech recognition have begun to diminish the barriers for CUIs. As the user interface paradigm slowly begins to embrace CUIs, time and resources will be required to retrain developers and rework software applications. Being able to reuse existing software code would provide immense benefit to organizations.

Further, users will need to become accustomed to interacting with CUIs instead of GUIs. Thus, it would be logical for software applications to transition from a GUI-based interface to one that supports both GUI and CUI interfaces—a multi-modal interface. With a multi-modal user interface for a software application, the user is able to try the CUI and resort to the GUI, if necessary.

SUMMARY

The present invention discloses a multi-modal conversion tool for generating conversation user interface code from GUI form code. The Conversation User Interface (CUI) code and the GUI form code can be combined into multi-modal form code, which synchronizes GUI elements and CUI ones. In one embodiment, the conversion performed by the conversion tool can be an automated or semi-automated conversion process that occurs during a design phase of a software development lifecycle. The GUI form code consumed by the multi-modal conversion tool can be GUI form code that natively lacks a conversation user interface specific elements (does not include native code to handle speech input and/or speech output, for example). Using the tool of the disclosure, developers can leverage their skills with creating GUI form code, when creating multi-modal and/or CUI code.

The disclosure can be implemented in accordance with many different aspects, as described herein. One aspect of the disclosure can include a method, a computer program product, a system, and/or an apparatus for generating a conversation user interface from a GUI form code. In the aspect, GUI form code comprising a set of GUI elements can be imported. A user interface description can be generated from the GUI form code. The user interface description can include a user interface element for each of the GUI elements of the GUI form code. For each of user interface elements converted from a corresponding to one of the GUI elements, a user interface element type can be determined as can temporal associations between the user interface elements. Conversation User Interface (CUI) code corresponding to the GUI form code can be created from the user interface description. When creating the CUI code for each of the user interface elements, different set of rules to convert the user interface element into CUI code can be used depending on a user interface element type of the user interface element being converted. When creating the CUI code, the user interface elements can be temporally ordered based on the pre-determined spatio-temporal associations between the graphical user interface (GUI) elements.

BRIEF DESCRIPTION OF THE SEVERAL VIEWS OF THE DRAWINGS

FIG. 5A is an example of the corresponding GUI description.

FIG. 5B is an example of the corresponding UI description.

FIG. 5C is an example of the corresponding CUI activity flow.

FIG. 8 shows a sample text screen for a conversation that is synchronized with an audible mode of a CUI.

DETAILED DESCRIPTION

Figure 1:
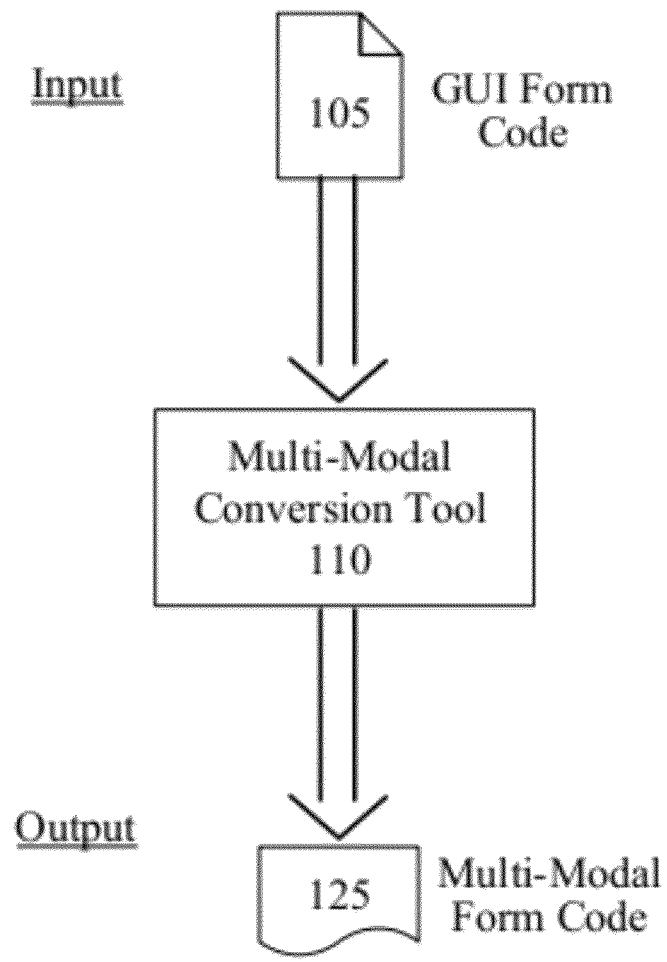
FIG. 1 is an input/output diagram for a multi-modal conversion tool in accordance with embodiments of the inventive arrangements disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is an input/output diagram 100 for a multi-modal conversion tool 110 in accordance with embodiments of the inventive arrangements disclosed herein. In input/output diagram 100, code 105 for a form-type graphical user interface (GUI) can be synthesized into multi-modal form code 125 by the multi-modal conversion tool 110.

The multi-modal form code 125 can include at least a GUI mode and a conversation mode. The conversation mode can be a mode within which a user audibly interacts with a computing device providing the multimodal interface. The audible interaction can be unidirectional (speech input or output) or bidirectional (speech input and output). Speech input is audible input including user speech, where the user speech is interpreted by the computing device to effectuate programmatic changes that are dependent upon the content of the speech input. Speech output is audible output produced by a computing device and able to be heard by a human user, where content of the speech output can vary depending upon a programmatic state of an application executing on the computing device. Speech input and/or speech output can be concurrently provided along with equivalent GUI input/output in one embodiment. In another, when speech input/output is provided, no equivalent input/output will be presented in a different mode (such as a visual one) of the multi-modal user interface.

The GUI form code 105 can represent the native software code of a form-type interface. A form-type interface, as used herein, can refer to an interface that solicits input from a user to perform a predefined action and provide the user with the outcome of the predefined action. Therefore, the GUI form code 105 defines the graphical elements used in the interface to capture and present information as well as the actions performed upon that information.

For example, the GUI form code 105 for an online database login form can be written using hypertext markup language (HTML) code. The HTML tags and attributes contained in the GUI form code 105 can define input areas where a user can be expected to enter identifying information (i.e., user name, email address, password, etc.). JAVASCRIPT code can also be included in the GUI form code 105 to authenticate the entered information when triggered by the user (i.e., selecting a "Submit" form button).

It should be emphasized that the GUI form code 105 relates specifically to a form that is written only for graphical rendering. That is, the GUI form code 105 can be written to accept/present data via use of graphical interface elements (e.g., text fields, drop-down menus, checkboxes, radio buttons, etc.) in conjunction with the input/output components (e.g., mouse, keyboard, monitor, touchpad, etc.) of the computing device upon which the GUI form code 105 is executed.

The multi-modal conversion tool 110 can represent a software application that can provide automated assistance for converting the GUI form code 105 into multi-modal form code 125. In one embodiment, the software application invoked upon execution of the multi-modal form code 125 can be interacted with using the features of a GUI and a conversation user interface (CUI). A CUI can receive input from a user in the form of speech and execute actions accordingly and/or can produce output for user consumption in the form of machine generated speech.

Thus, the multi-modal form code 125 can be software code that defines the form defined by the GUI form code 105 such that it can be rendered as a GUI and a CUI. This can allow the single-mode GUI form code 105 to be converted to multi-modal form code 125 without a separate development effort for the CUI portion.

In one embodiment, the conversion performed by conversion tool 110 can occur during a development phase, so that multi-modal form code 125 can result from a development effort in which designers only explicitly produced GUI form code. In such an embodiment, automatically generated multi-modal form code 125 can be edited (refined) after it is generated and before it is delivered to a runtime environment.

In one embodiment, the conversion performed by the conversion tool 110 can occur dynamically at runtime. In such an embodiment, multi-modal form code 125 can be dynamically generated from the GUI form code 105. This can occur at a server that provides either the GUI form code 105 or the multi-modal form code 125 to requesting clients; within middleware (e.g., can be provided as a server) by a network element that receives the GUI form code 105 from a server and provides the multi-modal form code 125 to a requesting client, and/or at a requesting client that receives GUI form code 105 from a server and executes the multi-modal form code 125 to present a multi-modal interface to a user.

Figure 2:
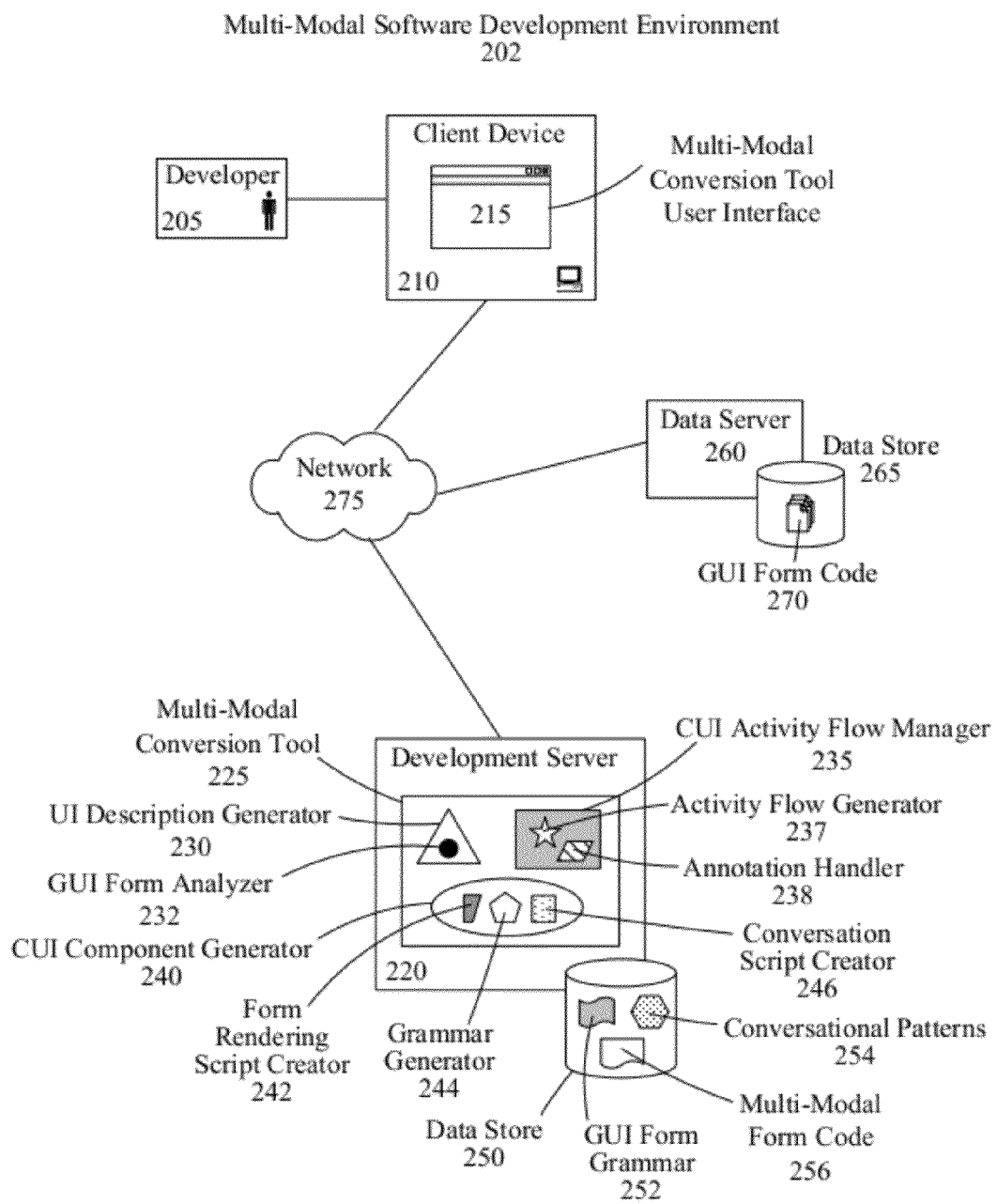
FIG. 2 is a schematic diagram illustrating a system that utilizes a multi-modal conversion tool to convert form-type graphical user interface (GUI) code into multi-modal form code in accordance with an embodiment of the inventive arrangements disclosed herein.

FIG. 2 is a schematic diagram illustrating a system 200 that utilizes a multi-modal conversion tool 225 to convert form-type graphical user interface (GUI) code 270 into multi-modal form code 256 in accordance with embodiments of the inventive arrangements disclosed herein. The elements shown in system 200 can perform according to the input/output diagram 100 of FIG. 1.

In system 200, a software developer 205 can convert existing GUI form code 270 to multi-modal form code 256 using the multi-modal conversion tool 225 within a multi-modal software development environment 202. The multi-modal software development environment 202 can represent a computing environment specifically configured for the development and testing of multi-modal software applications. The multi-modal software development environment 202 can utilize a variety of computing components; the computing components of particular interest to this embodiment of the present invention can include a client device 210, a development server 220, and a data server 260 communicatively linked via network 275.

The client device 210 can represent a variety of computing devices having the hardware and software to support operation of the multi-modal conversion tool user interface 215. The multi-modal conversion tool user interface 215 can represent the means by which the developer 205 can access the functionality of the multi-modal conversion tool 225.

The development server 220 can represent the hardware and/or software components required to support operation of the multi-modal conversion tool 225 to produce multi-modal form code 256. As with the client device 210, the development server 220 can include auxiliary components (not shown) specific to the development and/or testing of a multi-modal software application, such as text-to-speech or speech recognition components.

It should be noted that, while such components are key to the execution of a multi-modal software application, this embodiment of the present invention does not directly require these components to function, and assumes that the run-time environment (development or production) for the multi-modal form code contains such auxiliary components.

In one embodiment (shown in system 200), the multi-modal conversion tool 225 can run upon the development server 220 and can be accessed over the network 275 by the developer 205 via the multi-modal conversion tool user interface 215. The multi-modal conversion tool 225 can represent a software application that can provide automated assistance for converting the GUI form code 270 into multi-modal form code 256.

Using the multi-modal conversion tool user interface 215, the developer 205 can designate the GUI form code 270 to be converted by the multi-modal conversion tool 225. The GUI form code 270 can be contained within the data store 265 of a data server 260 accessible by the client device 210 and the multi-modal conversion tool 225.

The data server 260 can represent the hardware and/or software components for managing access to the contents of a data store 265. For example, in one embodiment, the data server 260 can be part of a configuration management system that performs version control and access management functions for the GUI form code 270.

In another embodiment, the GUI form code 270 can be stored external to the multi-modal software development environment 202. In such an embodiment, the GUI form code 270 can be imported into the multi-modal software development environment 202 via a function of the multi-modal conversion tool 225 or copied from a portable data device connected to the client device 210 or development server 220.

The GUI form code 270 can be written in a standardized programming language that is supported by the multi-modal conversion tool 225. Language examples in which GUI form code 270 can be written can include, but are not limited to, HTML, extensible markup language (XML), extensible hypertext markup language (XHTML), XForms, and the like. In one embodiment, dynamic languages (languages that generate dynamic code) such as JAVA and JAVA scripts can be supported by tool 225.

Once the GUI form code 270 is designated, the multi-modal conversion tool 225 can begin the conversion process. To perform the tasks of the conversion process, the multi-modal conversion tool 225 can include a user interface (UI) description generator 230, a conversation user interface (CUI) activity flow manager 235, a CUI component generator 240, and a data store 250 containing a GUI form grammar 252 and conversational patterns 254.

The UI description generator 230 can represent the component of the multi-modal conversion tool 225 configured to create a UI description (not shown) of the GUI form code 270. The UI description can represent an intermediate data structure used by the multi-modal conversion tool 225 to describe the type, relationship, and spatial orientation of GUI elements defined in the GUI form code 270 as an interaction-flow model. Specific details of the UI description will be discussed in later Figures.

The UI description generator 230 can include a GUI form analyzer 232. The GUI form analyzer 232 can be configured to analyze the inputted GUI form code 270 with respect to the GUI form grammar 252 during generation of the UI description.

The GUI form grammar 252 can represent a schema that defines and validates the structure and semantics for the language in which the GUI form code 270 is written. The GUI form grammar 252 can describe supported elements, the type and properties of the elements, valid data values for the elements and/or properties, and so on. The GUI form grammar 252 can be implemented as an encompassing single data entity (i.e., a notebook with subsections for each supported programming language) or as multiple data entities (i.e., a notebook for each programming language).

For example, the GUI form grammar 252 pertaining to HTML can contain the tags; tag attributes, and attribute values used in HTML forms and associate how each tag, tag attribute, and attribute value is to be interpreted by the GUI form analyzer 232 and/or UI description generator 230.

Once the UI description generator 230 is finished, the CUI activity flow manager 235 can use the generated UI description to create a CUI activity flow (not shown). The CUI activity flow can represent another intermediate data structure used by the multi-modal conversion tool 225 to define the UI description in terms of temporally-related tasks. Specific details of the CUI activity flow will be discussed in later Figures.

The CUI activity flow manager 235 can utilize an activity flow generator 237, an annotation handler 238, and the conversational patterns 254. The activity flow generator 237 can represent the component of the CUI activity flow manager 235 configured to determine the tasks and temporal relationships of elements in the UI description to create the CUI activity flow.

The annotation handler 238 can be configured to allow annotation of the CUI activity flow by the developer 205, such as for defining additional properties. The annotation handler 238 can also be configured to automatically annotate the CUI activity flow with dialogue fragments defined in the conversational patterns 254.

The conversational patterns 254 can represent a mapping between an element type used in the UI description and one or more predefined phrases associated with that element type. The conversational patterns 254 can be manually added/modified by the developer 205 using the multi-modal conversion tool user interface 215 and/or captured automatically by the multi-modal conversion tool 225 through development activities.

Once annotation of the CUI activity flow is complete, the CUI component generator 240 can use the CUI activity flow to create the multi-modal form code 256. The CUI components (not shown) of the multi-modal form code 256 can be created by the form rendering script creator 242, grammar generator 244, and conversation script creator 246.

The form rendering script creator 242 can create the scripts necessary for textually rendering the contents of the form in the CUI. The grammar generator 244 can create a speech recognition grammar to be used at run-time to interpret user input. The conversation script creator 246 can create the conversation script that interacts with a user, such as prompting for input.

Network 275 can include any hardware/software/and firmware necessary to convey data encoded within carrier waves. Data can be contained within analog or digital signals and conveyed though data or voice channels. Network 275 can include local components and data pathways necessary for communications to be exchanged among computing device components and between integrated device components and peripheral devices. Network 275 can also include network equipment, such as routers, data lines, hubs, and intermediary servers which together form a data network, such as the Internet. Network 275 can also include circuit-based communication components and mobile communication components, such as telephony switches, modems, cellular communication towers, and the like. Network 275 can include line based and/or wireless communication pathways.

As used herein, presented data stores 250 and 265 can be a physical or virtual storage space configured to store digital information. Data stores 250 and 265 can be physically implemented within any type of hardware including, but not limited to, a magnetic disk, an optical disk, a semiconductor memory, a digitally encoded plastic memory, a holographic memory, or any other recording medium. Data stores 250 and 265 can be a stand-alone storage unit as well as a storage unit formed from a plurality of physical devices. Additionally, information can be stored within data stores 250 and 265 in a variety of manners. For example, information can be stored within a database structure or can be stored within one or more files of a file storage system, where each file may or may not be indexed for information searching purposes. Further, data stores 250 and/or 265 can utilize one or more encryption mechanisms to protect stored information from unauthorized access.

Figure 3:
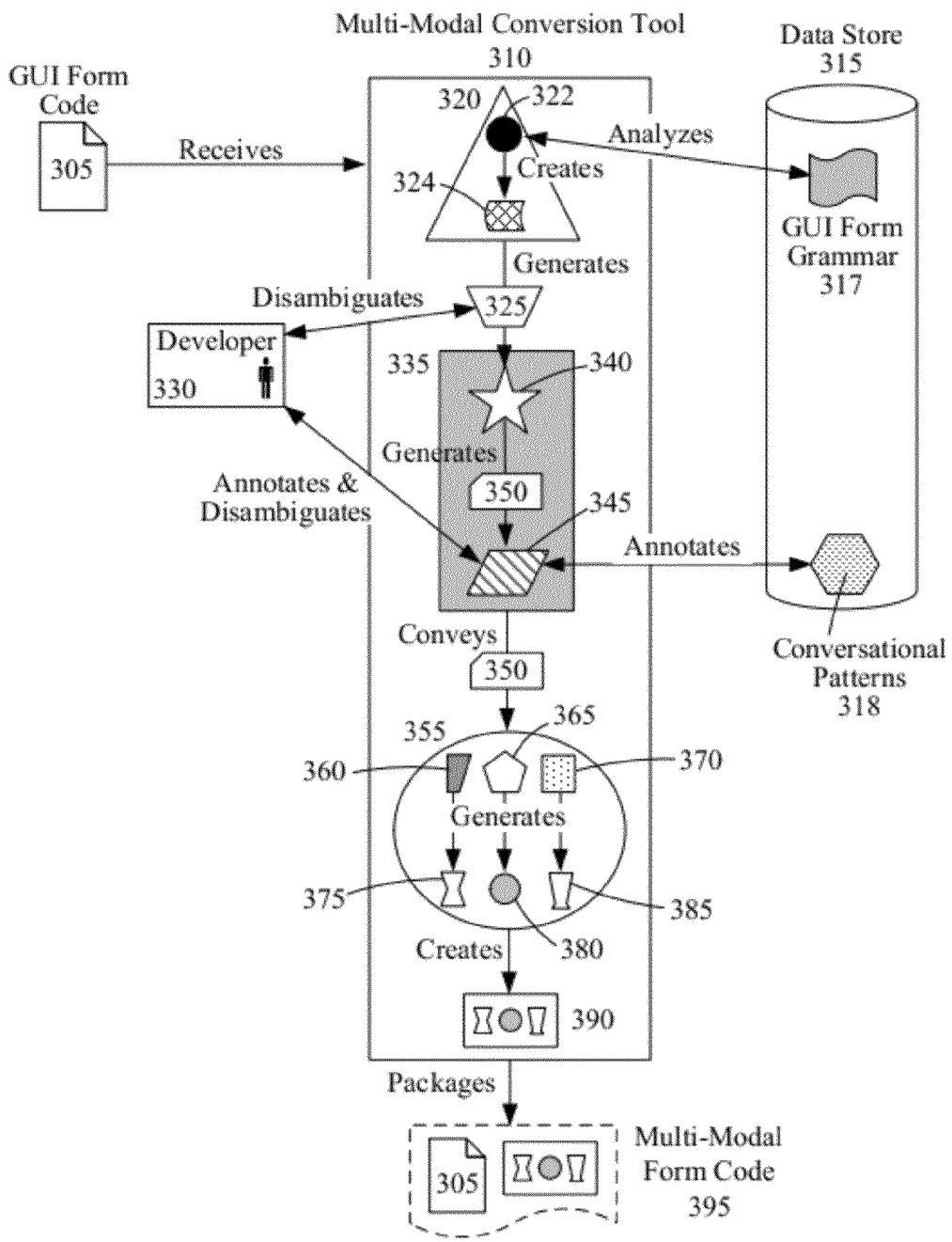
FIG. 3 is an illustrated process flow describing the generation of multi-modal form code from GUI form code by the multi-modal conversion tool in accordance with an embodiment of the inventive arrangements disclosed herein.

FIG. 3 is an illustrated process flow 300 describing the generation of multi-modal form code 395 from GUI form code 305 by the multi-modal conversion tool 310 in accordance with embodiments of the inventive arrangements disclosed herein. Process flow 300 can be performed within the context of system 100.

Process flow 300 can begin when the multi-modal conversion tool 310 receives GUI form code 305 for conversion. The GUI form code 305 can be analyzed by the GUI form analyzer 322 component of the UI description generator 320. Using the GUI form grammar 317 from the data store 315 that corresponds to the language of the GUI form code 305, the GUI form analyzer 322 can create a GUI description 324.

The GUI description 324 can be a metadata representation of the GUI form code 305. Metadata captured in the GUI description 324 can include the elements used in the GUI form code 305, the type, properties, and values of the elements, relationships between the elements (i.e., groups and subgroups), and the temporal flow or order in which the elements are presented to a user.

Identification of the GUI form elements and their types, properties, and values can be based on the contents of the GUI form grammar 317. The relationship and temporal flow of the GUI elements can be determined from an analysis of the spatial orientation or layout of the GUI elements within the GUI form code 305.

From the GUI description 324 the UI description generator 320 can generate the UI description 325. The UI description 325 can express the GUI description 324 as an interaction flow model. Further, the UI description 325 can utilize a common representation schema. This means that the UI description 325 of a specific form can be identical regardless of what language the GUI form code 305 is written.

For example, a feedback form can include a name field and a comment field. The feedback form can then be written using HTML and XForms formats. When processed by the UI description generator 320, the GUI form code 305 for both the HTML format and XForms format can result in the same UI description 325, despite the differences in how the UI elements are expressed in the different formats.

When generating the UI description 325, the UI description generator 320 can translate the GUI elements identified in the GUI description 324 into UI elements that represent the basic operational elements of human-computer interaction. As shown in the table below, each type of UI element can correspond to a logical grouping of GUI elements.

| UI Element Type | Description | Example |
| --- | --- | --- |
| Assertion Element | A collection of assertions (similar to filling a form) | Display: Input |
| Action Element | Actionable elements (performing a task) | Action |
| Interrogatory Element | Information-retrieval-queries (querying a repository) | |
| Conversation Container Element | A group of GUI elements | Form |

| UI Element Type | Description | Example |
|---|---|---|
| Display Element | | Display |

Further, the temporal association between UI elements in the can be determined based on:
- the spatial orientation of GUI elements in the GUI form,
- parent-child relationships between GUI elements in the GUI form, and
- the tab-order of GUI elements in the GUI form.

The UI description 325 can be written to conform to a specified schema, such as the example shown below.

| UI Description Schema |
|---|
| ```
<?xmlversion="1.0"?>
<xs:schema xmlns:xs=http://www.w3.org/2001/XMLSchema >
<xs:element name="UI">
    <xs:complexType>
        <xs:element name="CG" maxOccurs="unbounded">
            <xs:complexType>
                <xs:element name="CSG" maxOccurs="unbounded">
                    <xs:attribute name="Name" type="xs:string" use="required"/>
                    <xs:attribute name="Type" type="UIElement" use="required"/>
                    <xs:attribute name="Properties" type="Properties"/>
                    <xs:attribute name="OrderNo" type="xs:positiveInteger" use="required"/>
                </xs:element>
            </xs:complexType>
            <xs:attribute name="Name" type="xs: string" use="required"/>
            <xs:attribute name="OrderNo" type="xs:positiveInteger" use="required"/>
        </xs:element>
    </xs:complexType>
<xs:simpleType name = "UIElement">
    <xs:restrictionbase="xs:string"/>
        <xs:enumeration value="Assertion"/>
        <xs:enumeration value="Action"/>
        <xs:enumeration value="Interrogatory"/>
        <xs:enumeration value="Container"/>
        <xs:enumeration value="Display"/>
    </xs:restriction>
</xs:simpleType>
<xs:complexType name = "Properties">
    <xs:any minOccurs="0"/>
</xs:complexType>
</xs:schema>
``` |

Once the UI description 325 is generated, the UI description 325 can be presented to the developer 330 for any necessary disambiguation. In addition, the GUI description 324 and a rendering of the GUI form code 305 can be presented with the UI description 325 such that selection of an element in any presentation highlights the corresponding elements of the other presentations.

For example, if the developer 330 were to select the "Submit" button of the presented form, the multi-modal conversion tool 310 would automatically highlight the lines of code within the GUI description 324 and UI description 325 that represent the "Submit" button.

The UI description 325 can then be passed to the CUI activity flow manager 335. The activity flow generator 340 can then generate a CUI activity flow 350 from the UI description 325. Each UI element contained in the UI description 325 can be translated into a task of the CUI activity flow 350. A task can represent a unit of conversation/dialogue or a flow control. Further, a task can be simple (a single action) or complex (an activity flow of tasks).

For example, the task "ask-username" would be a simple task that asks the user for their username. The task "ask-fontDetails", however, would be a complex task because the user would be asked to provide data for multiple data fields; the population of each data field represented by a separate simple task.

The tasks can be identified within the CUI activity flow 350 in accordance with a predetermined format similar to the example in the proceeding table.

| UI Element Type | Task Annotation |
|---|---|
| Assertion | ask-<Name of the Task>( ) <br> e.g. assertUserName( ) |

-continued

| UI Element Type | Task Annotation |
|---|---|
| Actionable | do-<Name of the Task>( ) <br> e.g. doLogin( ) |
| Display | tell-<Name of the Task>( ) <br> e.g. tell-result( ) |
| Container | start-<Name of the Task>( ) <br> e.g. startLoginForm( ) |

Once the activity flow generator 340 is finished, the annotation handler 345 can add annotations to the CUI activity flow 350 using the conversational patterns 318. Examples of conversational patterns 318 for the different types of UI elements can include those shown in the following table.

| UI Element Types | Example Conversation Patterns |
|---|---|
| Assertion | Dialogue: Request <br> Get the <Name of the Task> <br> Provide the <Name of the Task> |

-continued

| UI Element Types | Example Conversation Patterns |
|---|---|
| | Dialogue: Response |
| | 1) <Name of the Task> is $Input |
| | 2) $Input |
| Action | Dialogue: Request |
| | Do the <Task> |
| | Perform the <Task> |
| | Dialogue: Response |
| | 1) <Task> successful |
| | 2) <Task> Failed |
| Display | Dialogue: Request |
| | Tell me the <Task> |
| | Dialogue: Response |
| | 1) Your <Task> is $Output |
| Container | Dialogue: Request |
| | 1) Start the <Task> |

When the annotation handler 345 is finished, the CUI activity flow 350 can be presented to the developer 330 for additional annotation and/or disambiguation. At this point, the developer 330 can be required to approve the content of the CUI activity flow 350 before the multi-modal conversion tool 310 continues.

The CUI activity flow 350 can then be sent to the CUI component generator 355 to create the CUI form code 390. The CUI form code 390 can be comprised of a CUI form rendering script 375, a CUI form speech recognition grammar 380, and a CUI form conversation script 385. The CUI form rendering script 375, a CUI form speech recognition grammar 380, and a CUI form conversation script 385 can be generated by the form rendering script creator 360, grammar generator 365, and conversation script creator 370, respectively.

Once the CUI form code 390 is created, the multi-modal conversion tool 310 can package the GUI form code 305 and the CUI form code 390 as a single element of multi-modal form code 395 for execution.

As used herein, presented data store 315 can be a physical or virtual storage space configured to store digital information. Data store 315 can be physically implemented within any type of hardware including, but not limited to, a magnetic disk, an optical disk, a semiconductor memory, a digitally encoded plastic memory, a holographic memory, or any other recording medium. Data store 315 can be a stand-alone storage unit as well as a storage unit formed from a plurality of physical devices. Additionally, information can be stored within data store 315 in a variety of manners. For example, information can be stored within a database structure or can be stored within one or more files of a file storage system, where each file may or may not be indexed for information searching purposes. Further, data store 315 can utilize one or more encryption mechanisms to protect stored information from unauthorized access.

Figure 4:
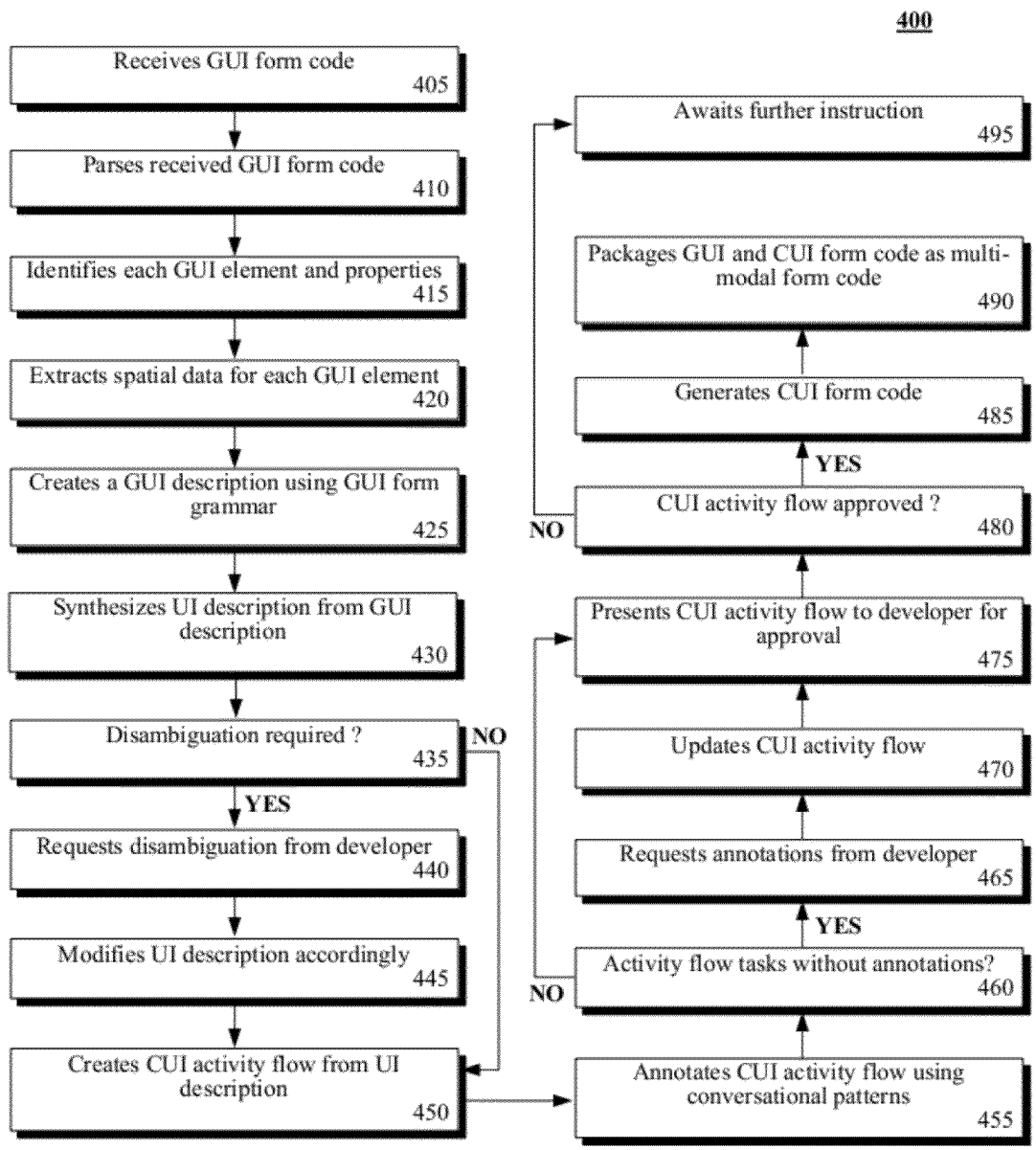
FIG. 4 is a flow chart of a method describing the generation of multi-modal form code from GUI form code by the multi-modal conversion tool in accordance with embodiments of the inventive arrangements disclosed herein.

FIG. 4 is a flow chart of a method 400 describing the generation of multi-modal form code from GUI form code by the multi-modal conversion tool in accordance with embodiments of the inventive arrangements disclosed herein. Method 400 can be performed within the context of system 200 and/or in conjunction with process flow 300.

Method 400 can begin in step 405 where the multi-modal conversion tool can receive GUI form code. The GUI form code can be parsed in step 410. In step 415, each GUI element and its associated properties can be identified from the parsed GUI form code. Data representing the spatial orientation of each GUI element can then be extracted in step 420.

In step 425, the GUI description can be created using the GUI form grammar corresponding to the language of the GUI form code. The UI description can be synthesized from the GUI description in step 430. In step 435, it can be determined if the UI description requires disambiguation.

When the UI description requires disambiguation, step 440 can execute where disambiguation of the UI description can be requested from the developer. The UI description can be modified according to the developer's input in step 445.

Upon completion of step 445 or when the UI description does not require disambiguation, step 450 can be performed where the CUI activity flow can be created from the UI description. The CUI activity flow can be annotated using the conversation patterns in step 455.

In step 460, it can be determined if the CUI activity flow contains tasks without annotations. When one or more tasks exist without annotations, annotation data for the task can be requested from the developer in step 465. In step 470, the CUI activity flow can be updated with the developer's annotation.

Upon completion of step 470 or when all the tasks of the CUI activity flow have annotations, step 475 can be performed where the CUI activity flow can be presented to the developer for approval. In step 480, it can be determined if the developer has approved the CUI activity flow.

When the developer does not approve the CUI activity flow, flow can proceed to step 495 where the multi-modal conversion tool can await further instruction. When the CUI activity flow is approved by the developer, the CUI form code can be generated in step 485. In step 490, the GUI and CUI form code can be packaged together as multi-modal form code.

Figure 5:
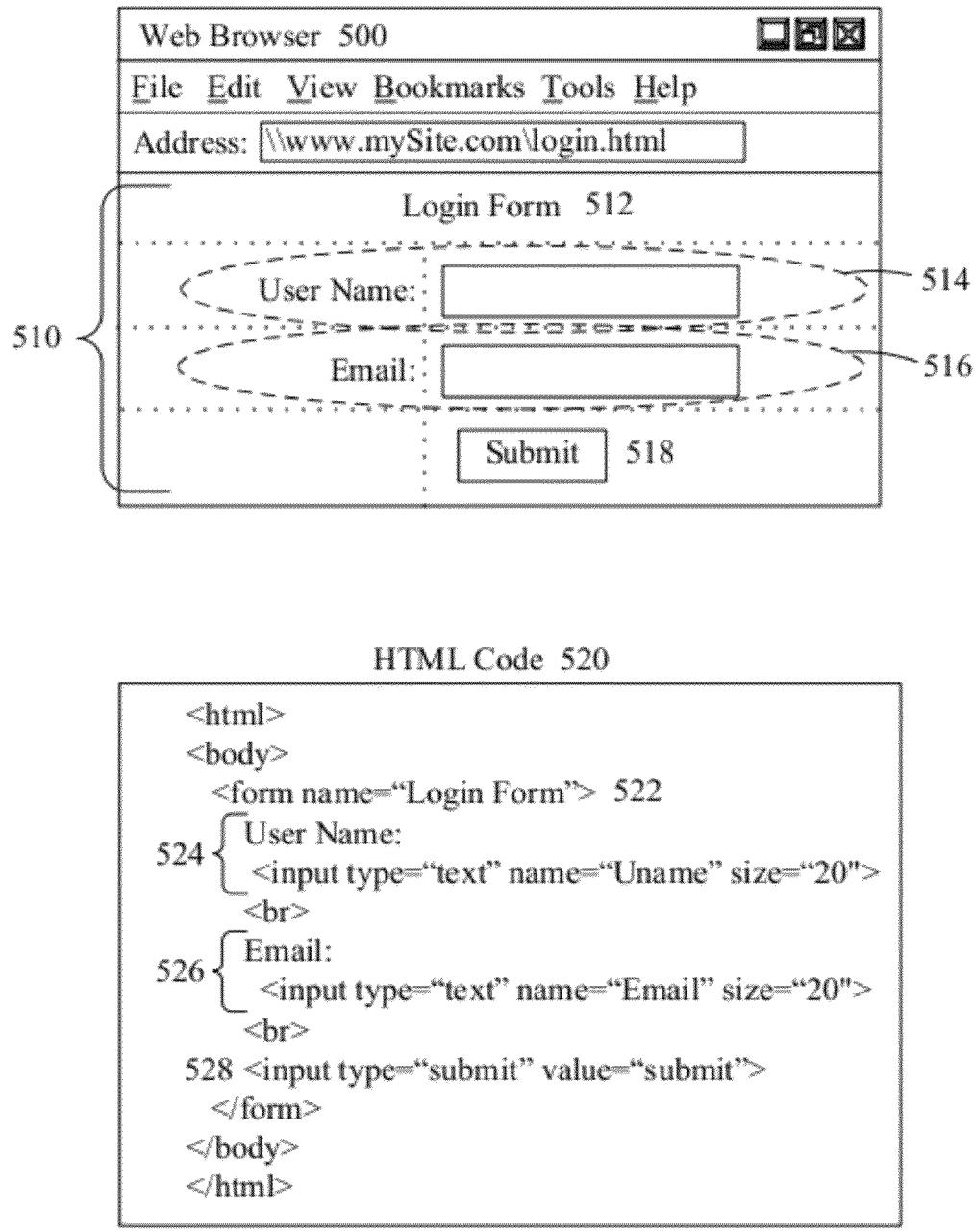
FIG. 5 illustrates a sample GUI form and its corresponding HTML code for use with the multi-modal conversion tool in accordance with embodiments of the inventive arrangements disclosed herein.

FIG. 5 illustrates a sample GUI form 510 and its corresponding HTML code 520 for use with the multi-modal conversion tool in accordance with embodiments of the inventive arrangements disclosed herein. The code samples presented in FIGS. 5, 5A, 5B, and 5C can be utilized within the context of system 200, process flow 300, and/or in conjunction with method 400.

The sample GUI form 510 of FIG. 5 can be rendered within Web browser 500. In this example, the sample GUI form 510 can include GUI elements defining a form name element 512, a user name element 514, an email element 516, and a submit button element 518.

It should be noted that the dotted lines shown in sample GUI form 510 are for illustrating an underlying tabular layout of the individual pieces of the GUI elements and are not a part of the actual rendering of the sample GUI form 510.

The HTML code 520 can contain the HTML tags, attributes, and values that define the sample GUI form 510 rendered by the Web browser 500. Line 522 can represent the code for the form name element 512. Lines 524, 526, and 528 can correspond to the user name element 514, email element 516, and submit button element 518, respectively.

When the multi-modal conversion tool processes the HTML code 520, the intermediary data structures illustrated in FIGS. 5A, 5B, and 5C can be generated and utilized in the creation of the multi-modal form code for the sample GUI form 510. As previously illustrated in process flow 300, the HTML code 520 can be used to generate the GUI description 530 of FIG. 5A.

The form tag from line 522 can be translated as group tag in line 532 having attributes that define the form as container laid out as a table with three rows and two columns. In this example, the HTML code 520 did not contain tags defining a table. However, the multi-modal conversion tool can attempt to put the GUI elements of the sample GUI form 510 into a grid layout for determining spatial orientation. Pre-processing of the GUI form code can be required when the language used is not readily translated into a grid layout similar to XForms.

In the GUI description 530, lines 534 can correspond to lines 524 of the HTML code 520 defining the user name element 514. In lines 534, the text, "User Name", can be identified as a display element, and the text field as an input element. Additionally, each element defined in the GUI description 530 can include their corresponding spatial orientation within the table layout in terms of horizontal position (row) and vertical position (column).

Similar to lines 534, lines 536 can correspond to lines 526 of the HTML code 520. The submit button element 518 defined as line 528 of the HTML code 520 can be represented in the GUI description 530 by an action element expressed in line 538.

From the GUI description 530, the UI description 540 of FIG. 5B can be generated. Generation of the UI description 540 by the multi-modal conversion tool can utilize a "Likely Pair" approach to determine the grouping of GUI elements based on their type and spatial orientation.

In this example, the following table of Likely Pair values can be used.

| TYPE | RELATION | LIKELY TYPE | RANK | NO OF HITS |
|---|---|---|---|---|
| Display | AND | Input | 1 | |
| | AND | Action | 2 | |
| | Single | — | 3 | |
| | AND | Display | 4 | |
| Input | | Display | 1 | |
| | And | Action | 2 | |
| | And | — | 3 | |
| | Single | Input | 4 | |
| Action | AND | — | 1 | |
| | | Display | 2 | |
| | SINGLE | Input | 3 | |
| | AND | Action | 4 | |
| Container | AND | — | 1 | |
| | AND | Container | 2 | |

For example, if the GUI element is a display type, then the most likely pair type is a GUI element of input type, since the input type has the highest rank. The rank can be calculated based on the number of hits that the pairing has received or can be assigned/modified by the developer.

The sample GUI form 510 of FIG. 5, can be parsed to find element groups by scanning the X- and Y-axis as shown in the following table.

| X → Y ↓ | 1 | 2 |
|---|---|---|
| 1 | UserName Label | UName Text |
| 2 | Email Label | Email Text |
| 3 | Submit Action | |

The X-axis scan will result in the following Likely Pair table.

| Sl No | Group | Rank |
|---|---|---|
| 1 | Display: Input | 1 |
| 2 | Display: Input | 1 |

-continued

| Sl No | Group | Rank |
|---|---|---|
| 3 | Action | 1 |
| | Total | 3 |

The Y-axis scan will result in the following Likely Pair table.

| Sl No | Group | Rank |
|---|---|---|
| 1 | Display: Display: Action | Not-available |
| 2 | Input: Input | 4 |
| | Total | 4 |

Since, the Likely pair table of the Y-axis scan, consists of an invalid Group "Display:Display:Action". It is broken down further into {Display & Display & Action}, {Display: Display & Action}, and {Display & Display:Action}. This re-grouping will result in the following three Likely Pair tables.

| S No | Group | Rank |
|---|---|---|
| 1 | Display | 3 |
| 2 | Display | 3 |
| 3 | Action | 1 |
| 4 | Input: Input | 4 |
| | Total | 11 |

| S No | Group | Rank |
|---|---|---|
| 1 | Display: Display | 4 |
| 2 | Action | 1 |
| 3 | Input: Input | 4 |
| | Total | 9 |

| S No | Group | Rank |
|---|---|---|
| 1 | Display | 3 |
| 2 | Display: Action | 2 |
| 3 | Input: Input | 4 |
| | Total | 9 |

The Likely Pair table of the X-axis scan and that of the Y-axis scan, which has the minimum total rank, is chosen as the recommended UI Element Group. In the sample GUI form 510 of FIG. 5, the {UserName(Label:Text):Assertion}, {Email(Label:Text):Assertion}, {Submit(Action):Action} form the recommended UI Element Group.

Thus, the UI description 540 can be determined to include a container group (CG) 542 and three container subgroups (CSGs) corresponding to UserName 544, Email 546, and Submit 548. The temporal flow of the UI description 540 can be expressed using the "orderNumber" property.

From the UI description 540, the CUI activity flow 550 of FIG. 5C can be generated. In the CUI activity flow 550, the four container elements 542-548 of the UI description 540 can be represented as tasks 552-558. The arrowed lines connecting the tasks 552-558 can represent the temporal progression of the CUI activity flow 550.

Thus, the CUI activity flow 550 can be performed by first executing the "start-LoginForm" task 552. Next, the "ask-UserName" task 554 can be performed, followed by the "ask-Email" 556 and "do-Submit" 558 tasks.

Figure 6:
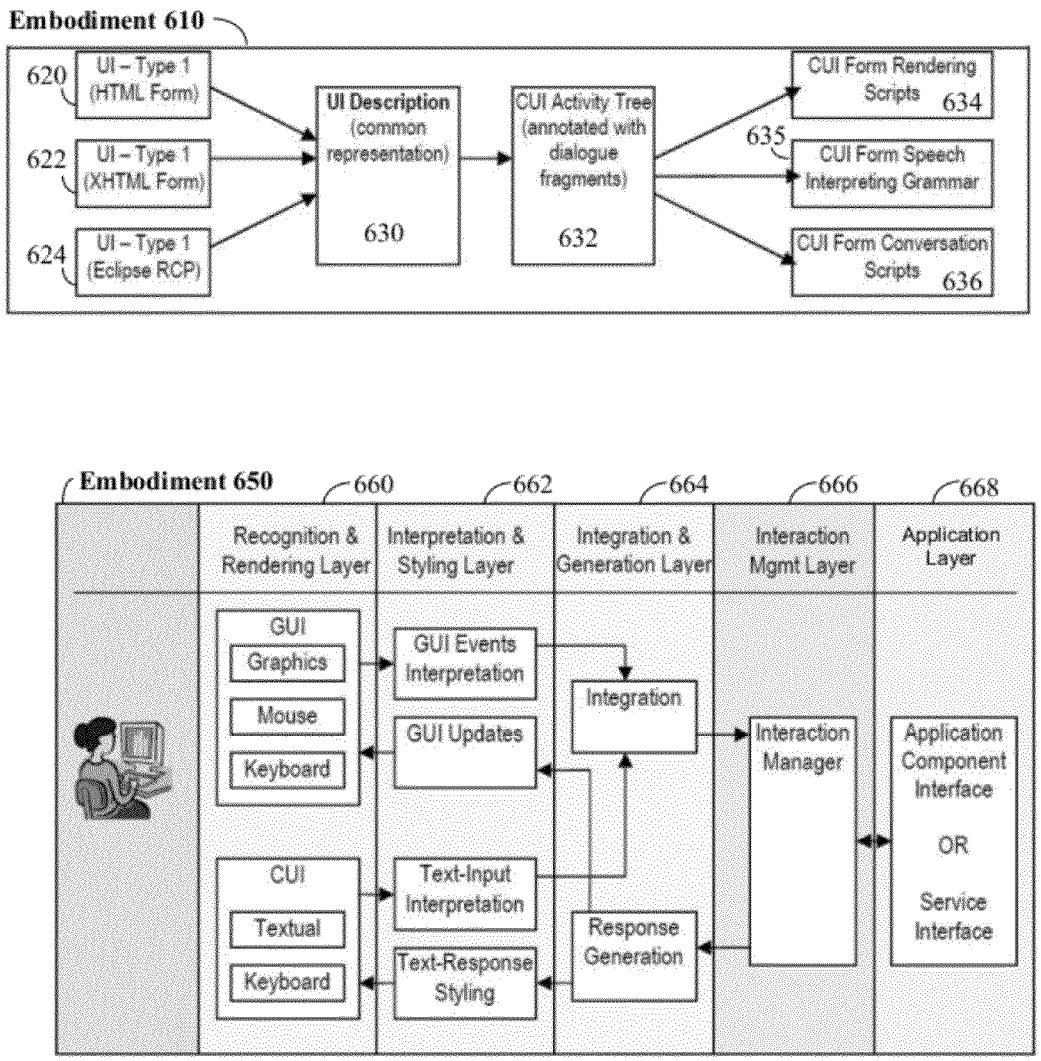
FIG. 6 shows a specific embodiment for producing multi-modal form code from GUI form code.

FIG. 6 shows a specific embodiment 610 for producing multi-modal form code 125 from GUI form code 105. Other embodiments are contemplated.

In embodiment 610, GUI form code in native formats (e.g., HTML 620, XHTML 6722, and ECLIPSE RCP 624, XFORM, etc.) are processed by a conversion tool (e.g., conversion tool 110). The tool generates a UI description 630 from the GUI form code module(s) 620-624. The UI description 630 can use a common representation. The common representation can include multiple sections, such as a description of form section, a description of how the form is visually presented (spatial positioning), and a description of form actions (what the form does).

Figure 7:
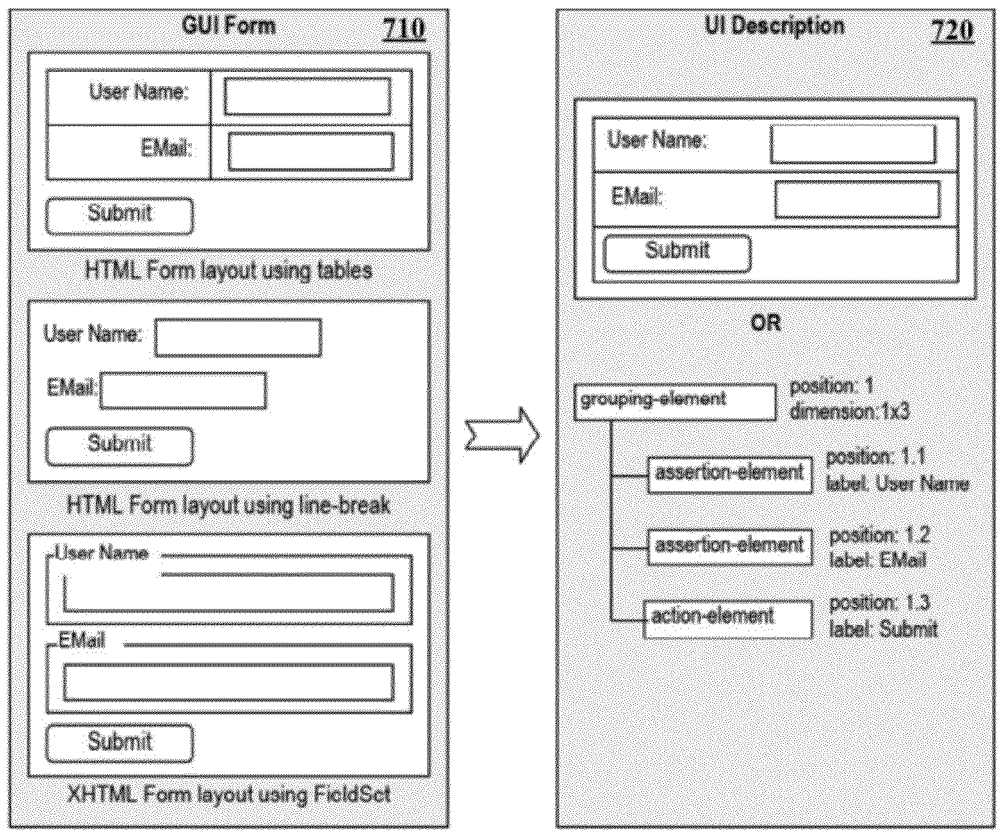
FIG. 7 visually shows an example of a GUI form being converted into a UI description, which is converted into a CUI activity tree.

The UI description 630 of a GUI Form(s) 620-624 can be visualized as a user-interaction meta-data of the GUI form. The spatial-flow/alignment of the GUI Elements in a GUI Form 620-624 can be extracted into the UI Description, so that they can be later re-described as a temporal-flow of conversational elements in the CUI Form. FIG. 7 visually shows an example of a GUI form 710 being converted into a UI description 720.

Once the UI description 630 is created, a CUI activity tree 632 can be generated. The activity tree 632 can be annotated with dialog fragments. As previously detailed when describing the conversion tool 310 and the CUI activity flow 350, each UI Element in a UI description 630 can map to a task in the activity flow of the activity tree 632. That is, the UI description 630 can be parsed to identify the UI elements and the temporal association and these will get mapped to set of tasks and the temporal flow of events respectively in the activity flow (of tree 632). A conversion pattern (such as one detailed in reference to convectional patterns 318) can be used to add annotations, which are able to be used for grouping the boundaries and for describing additional properties. Tree 730 shows an example of a CUI activity tree (generated from UI description example 720).

Although the specific types of CUI components generated from activity tree 632 can vary based upon implementation choices, one option is to generate components 634-636. Component 634 represents CUI form rendering scripts. Each of these scripts can be used by a CUI run-time component to read-out (or textually render) the contents of the form.

Component 635 represents CUI form speech recognition grammars. The grammars can be used by the CUI run-time to interpret audibly spoken user input (when processed using speech recognition technologies). In one configuration, the speech recognition grammar of component 634 can be used to interpret and convert natural language utterances in to a form (say text) that can be used for further processing. The user input is captured and the input is translated into a form useful for later processing for the Semantic Interpretation component. In one contemplated arrangement, the semantic interpretation and the speech recognition grammar are implemented based on W3C's Speech Recognition Grammar Specification (SRGS) and Semantic Interpretation for Speech Recognition (SISR).

Thus, In order to process speech inputs, W3C Semantic Interpretation for Speech Recognition (SISR) defines the process of Semantic interpretation whose results describe the meaning of natural language utterance. This specification defines the process of Semantic Interpretation for Speech Recognition and the syntax and semantics of semantic interpretation tags that can be added to speech recognition grammars to compute information to return to an application on the basis of rules and tokens that were matched by the speech recognizer. In particular, it defines the syntax and semantics of the contents of Tags in the Speech Recognition Grammar Specification [SRGS]. The Semantic Interpretation Tags (SI Tags) provides a means to attach instructions for the computation of such semantic results to a speech recognition grammar.

Component 636 represents CUI form conversation scripts. The conversion scripts can be used by the CUI run-time component to prompt for inputs, as guided by the activity flow of tree 632. The conversation scripts can also textually render error messages (if any) generated by the CUI form when executed. Hence, CUI for conversation script component 636 can be a logical component that coordinates data and manages execution flow. Component 636 can also maintain the interaction state and context of the application and responds to various user inputs. This state information permits synchronization of events/actions between GUI code 620-624 elements and CUI code.

In one embodiment, a "chat-like interface" can be presented within a GUI that textually shows speech that is audibly conveyed (output) and received (input) via the CUI form. Example 800 of FIG. 8 shows a sample chat window content that corresponds to tree 730 of FIG. 7. The showing of the "chat window" can be an option for the multi-modal interface that a user can selectively enable or disable.

The components 634-636 can be tailored for specific run-time components. The run-time components can ensure that multi-modal interactions between GUI-form code CUI form code are synchronized. The run-time environment able to use component 634-636 can utilize a layered architecture, as shown in embodiment 650. The disclosure is not to be limited in this regard and alternative runtime components are contemplated.

As shown in embodiment 650, a layered architecture (as recommended by the W3C MMI Framework), is used which comprises a recognition and rendering layer 660, an interpretation and styling layer 662, an integration and generation layer 664, an interaction management layer 666, and an application layer 668.

The recognition and rendering layer 660 can render the GUI content graphically in a canvas. Layer 660 can similarly render CUI content textually in a chat-like interface (see example 800) if such an option is implemented and available. Layer 660 can accept inputs from users as raw events (such as mouse-move, mouse-click, keyboard pressed etc.). It can recognize and translates these raw events into UI events (such as button-pressed, set-focus, select-menu, etc., in GUI and typing-text, send-text, etc., in CUI). In one embodiment, components in the recognition and rendering layer 660 can be provided by the operating environment (for example, Windows operating system, Java virtual machine, Chat interfaces, etc.).

The interpretation and styling layer 662 can style the response/output. This can involve laying-out the information graphically in the GUI-Form and as proper-sentences in chat-interface (CUI-Form). The input to this layer can be from the generation layer 664. The input can include XML-documents, Java data objects, or other such artifacts. Layer 662 can interpret the UI Events (originating from the recognition layer 660) to understand the user intent (or meaning/semantics) and generate events. These generated events can be Extensible MultiModal Annotation markup language (EMMA) encoded ones.

The integration and generation layer 664 can accept inputs from the different UI nodes are integrated at this layer 664. The input EMMA events originating from the interpretation layer 662 can be used to populate and validate the data-model. When data-validation fails, then the layer 664 will generate fault/error messages as response. Responses from the application layer 668 can be transformed into an XML document, a Java data-object, and the like, which can be sent to the styling layer 662.

The interaction management layer 666 can handle interactions (input, output) between the user and the application with the multi-modal interface. The application can be conceptualized as a series of dialogs, managed by an interaction manager of layer 666. A dialog can be an interaction between the user and the application that involves turn taking. In each turn, the interaction manager working on behalf of the application can collect input from the user, can process it using the session context and possibly external knowledge sources, and can compute a response and updates the presentation for the user.

The application layer 668 can receive user-inputs events. In one embodiment, input events in the GUI of the application will be largely accepted, interpreted and processed by the GUI layer. In cases where the events are propagated and handled by the interaction management layer 666, the response will be sent back to both modes of the multi-modal user-interface (GUI & CUI). Similarly, other than the CUI events (set-event, & get-event) which can be handled by the integration-layer 666, the responses from the interaction management layer 666 can result in updating the GUI & CUI.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for generating a Conversation User Interface (CUI) from a graphical user interface (GUI) comprising:
   importing GUI form code comprising a plurality of GUI elements;
   generating a user interface description from the GUI form code, where the user interface description comprises a user interface element for each of the GUI elements of the GUI form code;
   for each of user interface element converted from a corresponding to one of the GUI elements, determining a user interface element type for the user interface element, wherein said determined user interface element type is one of a plurality of different element types;
   for each user interface element, determining temporal associations between the user interface element and other ones of the user interface elements, wherein said temporal associations are dependent upon characteristics of the corresponding GUI element relative to other ones of the GUI elements within the GUI form code;
   determining whether disambiguation is needed for any of the GUI elements when generating the user interface description;
   when no disambiguation is needed, automatically generating the user interface description from the GUI form code without any user input;
   when disambiguation is needed, prompting a user for disambiguation input for each GUI element for which disambiguation is needed, receiving a user response to the prompting, disambiguating otherwise ambiguous GUI elements utilizing the user response when generating the user interface description;
   creating Conversation User Interface (CUI) code corresponding to the GUI form code from the user interface description, wherein the conversation user interface (CUI) code and the graphical form code is integrated and synchronized to form multi-modal user interface code having a visual and a voice interactive modality;
   when creating the Conversation User Interface (CUI) code for each of the user interface elements of the user interface description, utilizing a different and rules to convert the user interface element into Conversation User Interface (CUI) code depending on a user interface element type of the user interface element being converted, and
   when creating the Conversation User Interface (CUI) code, temporally ordering the user interface elements based on the determined temporal associations between the user interface elements.

2. The method of claim 1, wherein the user interface description corresponds to the GUI form code, but is language independent, where the GUI form code is specific to a programming language.

3. The method of claim 2, wherein the conversion from GUI form code to the user interface description is performed by executing an injective function that preserves distinctness in that every element of the injective function's codomain is mapped to by at most one element of the injective function's domain, wherein executing the injective function against different GUI form code segments that are substantially equivalent to each other yet written in different programming languages results in the same user interface description being generated.

4. The method of claim 1, wherein the GUI form code natively lacks conversation user interface specific elements, which are generated automatically by programmatic routines without manual user coding for the conversation user interface code being required.

5. The method of claim 1, wherein the voice interactive modality uses the conversation user interface code to accept and process speech input and to generate speech output, where the speech input and speech output is synchronized with GUI elements of the GUI form code.

6. The method of claim 5, wherein the visual modality of the multi-modal user interface comprises a chat section within which the speech input is visually presented as text and within which speech output is visually presented as text, wherein the speech input and speech output are handled in accordance with the conversation user interface (CUI) code.

7. The method of claim 1, wherein the determined temporal associations between the user interface elements is determined based on a spatial orientation of corresponding GUI elements of the GUI form code, of parent-child relationships between the corresponding GUI elements in the GUI form code, and of tab order of the corresponding GUI elements in the GUI form code.

8. The method of claim 1, wherein said user interface element type is determined from a set of user interface element types comprising an association type for an assertion element, an action type for an action element, an interrogator type for an interrogatory element, a container type for a container element, and a display type for a display element.

9. The method of claim 8, wherein the determined user interface element type for at least one of the user interface elements is for an assertion element.

10. The method of claim 8, wherein the determined user interface element type for at least one of the user interface elements is for an action element.

11. The method of claim 8, wherein the determined user interface element type for at least one of the user interface elements is for an interrogatory element.

12. The method of claim 8, wherein the determined user interface element type for at least one of the user interface elements is for a container element.

13. The method of claim 8, wherein the determined user interface element type for at least one of the user interface elements is for a display element.

14. The method of claim 1, further comprising:
transforming the user interface description into a conversation user interface (CUI) flow, wherein said conversation user interface (CUI) flow comprises a plurality of nodes and edges, each node representing a task, each edge representing a temporal flow in a dialog, wherein the conversation user interface (CUI) code is generated from the conversation user interface (CUI) flow.

15. The method of claim 1, further comprising:
generating a Conversation User Interface (CUI) activity tree from the user interface description;
annotating the activity tree with dialog fragments;
generating Conversation User Interface (CUI) rendering scripts, Conversation User Interface (CUI) form speech interpreting grammar entries, and Conversation User Interface (CUI) conversational scripts from the annotated activity tree, wherein the Conversation User Interface (CUI) code includes the Conversation User Interface (CUI) rendering scripts, the Conversation User Interface (CUI) form speech interpreting grammar entries, and the Conversation User Interface (CUI) conversational scripts.

16. The method of claim 15, wherein the Conversation User Interface (CUI) rendering scripts are each scripts used by a Conversation User Interface (CUI) run-time to textually render contents of the GUI elements, wherein the conversation form speech recognition grammar is a script used by a CUI run-time to interpret user input provided as speech, and wherein the CUI form conversation script is a script used by a CUI run-time to prompt a user for input and to textually render error messages.

17. A computer program product comprising a non-transitory computer readable storage medium having computer usable program code embodied therewith, the computer usable program code comprising:

computer usable program code stored in a non-transitory storage medium operable to import GUI form code comprising a plurality of GUI elements;

computer usable program code stored in a non-transitory storage medium operable to generate a user interface description from the GUI form code, where the user interface description comprises a user interface element for each of the GUI elements of the GUI form code;

computer usable program code stored in a non-transitory storage medium operable to, for each of user interface element converted from a corresponding to one of the GUI elements, determine a user interface element type for the user interface element, wherein said determined user interface element type is one of a plurality of different element types;

computer usable program code stored in a non-transitory storage medium operable to, for each user interface element, determine temporal associations between the user interface element and other ones of the user interface elements, wherein said temporal associations are dependent upon characteristics of the corresponding GUI element relative to other ones of the GUI elements within the GUI form code;

computer usable program code stored in a non-transitory storage medium operable to determine whether disambiguation is needed for any of the GUI elements when generating the user interface description;

computer usable program code stored in a non-transitory storage medium operable to, when no disambiguation is needed, automatically generate the user interface description from the GUI form code without any user input;

computer usable program code stored in a non-transitory storage medium operable to, when disambiguation is needed, prompt a user for disambiguation input for each GUI element for which disambiguation is needed, receiving a user response to the prompting, disambiguating otherwise ambiguous GUI elements utilizing the user response when generating the user interface description;

computer usable program code stored in a non-transitory tangible storage medium operable to create Conversation User Interface (CUI) code corresponding to the GUI form code from the user interface description, wherein the conversation user interface (CUI) code and the graphical form code is integrated and synchronized to form multi-modal user interface code having a visual and a voice interactive modality;

computer usable program code stored in a non-transitory storage medium operable to, when creating the Conversation User Interface (CUI) code for each of the user interface elements of the user interface description, utilize a different and rules to convert the user interface element into Conversation User Interface (CUI) code depending on a user interface element type of the user interface element being converted, and computer usable program code stored in a tan non-transitory storage medium operable to, when creating the Conversation User Interface (CUI) code, temporally order the user interface elements based on the determined temporal associations between the user interface elements.

18. A system for generating a Conversation User Interface (CUI) from a graphical user interface (GUI) comprising:
a processor;
a non-volatile data store;

a communication bus communicatively connecting the processor and the non-volatile data store to each other; and at least one computer program product digitally encoded within the non-volatile data store and operable to be executed by the processor, wherein running the computer program product within the system causes the system to:

import GUI form code comprising a plurality of GUI elements;

generate a user interface description from the GUI form code, where the user interface description comprises a user interface element for each of the GUI elements of the GUI form code;

for each of user interface element converted from a corresponding to one of the GUI elements, determine a user interface element type for the user interface element, wherein said determined user interface element type is one of a plurality of different element types;

for each user interface element, determine temporal associations between the user interface element and other ones of the user interface elements, wherein said temporal associations are dependent upon characteristics of the corresponding GUI element relative to other ones of the GUI elements within the GUI form code;

determine whether disambiguation is needed for any of the GUI elements when generating the user interface description;

when no disambiguation is needed, automatically generate the user interface description from the GUI form code without any user input;

when disambiguation is needed, prompt a user for disambiguation input for each GUI element for which disambiguation is needed, receiving a user response to the prompting, disambiguating otherwise ambiguous GUI elements utilizing the user response when generating the user interface description;

create Conversation User Interface (CUI) code corresponding to the GUI form code from the user interface description, wherein the conversation user interface (CUI) code and the graphical form code is integrated and synchronized to form multi-modal user interface code having a visual and a voice interactive modality;

when creating the Conversation User Interface (CUI) code for each of the user interface elements of the user interface description, utilize a different and rules to convert the user interface element into Conversation User Interface (CUI) code depending on a user interface element type of the user interface element being converted, and when creating the Conversation User Interface (CUI) code, temporally order the user interface elements based on the determined temporal associations between the user interface elements.

* * * * *